United States Patent
Bradshaw et al.

(10) Patent No.: US 8,780,137 B2
(45) Date of Patent: Jul. 15, 2014

(54) SYSTEMS TO GENERATE MULTIPLE LANGUAGE VIDEO OUTPUT

(75) Inventors: Jeffrey K. Bradshaw, Southbury, CT (US); Gordon K. Schmidt, Burlington, CT (US); Joseph Ronald Durante, North Haven, CT (US); Oyvind Gjorven, Canton, CT (US); William J. Gairing, Naugatuck, CT (US)

(73) Assignee: Disney Enterprises, Inc., Burbank, CA (US)

(*) Notice: Subject to any disclaimer, the term of this patent is extended or adjusted under 35 U.S.C. 154(b) by 417 days.

(21) Appl. No.: 12/751,497

(22) Filed: Mar. 31, 2010

(65) Prior Publication Data
US 2011/0242419 A1 Oct. 6, 2011

(51) Int. Cl.
G09G 5/00 (2006.01)
G06F 15/16 (2006.01)

(52) U.S. Cl.
USPC ........... 345/636; 345/619; 345/629; 345/634; 345/641; 709/204; 709/208; 709/227; 709/228

(58) Field of Classification Search
CPC ........ H04L 29/00; H04L 29/02; H04L 29/06; H04L 29/06006–29/06027; H04L 29/08081; H04L 29/0809; H04L 29/08099; H04L 29/08306; H04L 29/0854
USPC .................. 345/619, 629, 632–636, 641; 715/716–726; 709/204–211, 227–237, 709/248
See application file for complete search history.

(56) References Cited

U.S. PATENT DOCUMENTS

| | | | |
|---|---|---|---|
| 5,931,908 A | 8/1999 | Gerba et al. | |
| 6,446,261 B1 | 9/2002 | Rosser | |
| 6,587,125 B1* | 7/2003 | Paroz | 715/740 |
| 7,197,715 B1 | 3/2007 | Valeria | |
| 7,996,461 B1* | 8/2011 | Kobres et al. | 709/204 |
| 2002/0157105 A1* | 10/2002 | Vienneau et al. | 725/105 |
| 2003/0090453 A1 | 5/2003 | Fischer | |
| 2003/0191805 A1* | 10/2003 | Seymour et al. | 709/204 |
| 2004/0177383 A1 | 9/2004 | Martinolich et al. | |
| 2008/0016175 A1* | 1/2008 | Glazberg et al. | 709/208 |
| 2008/0172637 A1 | 7/2008 | Chang et al. | |
| 2009/0077474 A1* | 3/2009 | Mohan et al. | 715/753 |
| 2009/0187610 A1* | 7/2009 | Guo | 707/203 |
| 2009/0187826 A1* | 7/2009 | Heimbold et al. | 715/719 |
| 2013/0151989 A1* | 6/2013 | Dent et al. | 715/753 |

OTHER PUBLICATIONS

Communication: European Search Report (Rule 61 EPC), dated Jun. 17, 2011, for European Patent Application No. 11156756.6-2202, 7pgs.
"English-translation of Office Action" dated Jul. 10, 2012 for Mexican Patent Application No. MX/A/20111003441, 4pgs.

* cited by examiner

Primary Examiner — Xiao Wu
Assistant Examiner — Michael J Cobb
(74) Attorney, Agent, or Firm — Buckley, Maschoff & Talwalkar LLC

(57) ABSTRACT

A system includes determination of a first graphic overlay associated with a first video feed, and automatic determination a second graphic overlay to associate with a second video feed based on the determined first graphic overlay. Determination of the first graphic overlay may include detection of a first manipulation of a first user interface of a first application executing on a first computing system, and automatic determination of the second graphic overlay may include execution of a second manipulation of a second user interface of a second application executing on a second computing system. In further aspects, the second manipulation corresponds to the first manipulation.

16 Claims, 12 Drawing Sheets

700

| STAT ID | ENGLISH | SPANISH |
|---|---|---|
| 12 | PASSES | PASES |
| 16 | SAVES | ATAJADAS |
| 18 | SHOTS | TIROS |
| 19 | SHOTS ON GOAL | TIROS AL ARCO |

*FIG. 7*

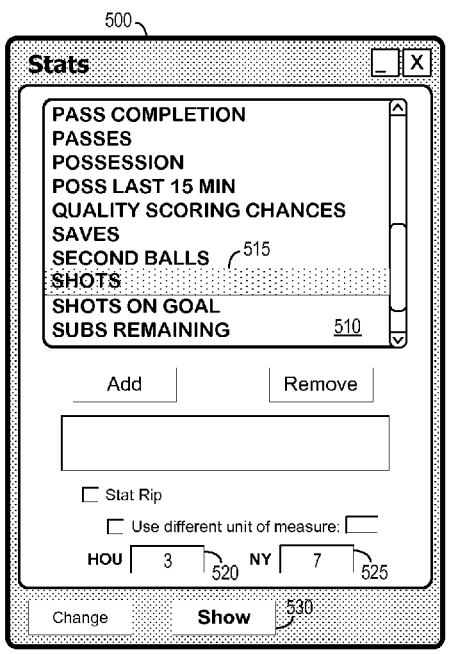 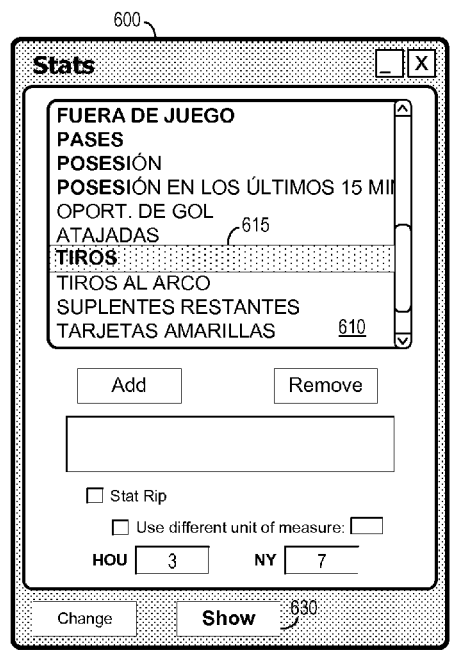
*FIG. 10*  *FIG. 11*

150

| STAT ID | ENGLISH GRAPHIC | SPANISH GRAPHIC |
|---|---|---|
| 12 | //StatServer/Graphics/Eng12.jpg | //StatServer/Graphics/Spn12.jpg |
| 16 | //StatServer/Graphics/Eng16.jpg | //StatServer/Graphics/Spn16.jpg |
| 18 | //StatServer/Graphics/Eng18.jpg | //StatServer/Graphics/Spn18.jpg |
| 19 | //StatServer/Graphics/Eng19.jpg | //StatServer/Graphics/Spn19.jpg |

*FIG. 12*

SYSTEMS TO GENERATE MULTIPLE LANGUAGE VIDEO OUTPUT

FIELD

The present invention relates to systems and methods to deliver information to users. Some embodiments relate to systems and methods for efficiently delivering content in multiple languages and/or formats.

BACKGROUND

Currently, it is common to broadcast a particular live event (e.g., a sporting event, a political event, a musical event) simultaneously to different global regions, or markets. According to a basic example, an identical video feed and a market-specific audio feed are broadcast to each market.

In the case of a sporting event played at a stadium, a main video feed is generated based on video signals captured by many different video cameras situated throughout the stadium. The sounds of play may be captured by similarly-situated microphones, and a main audio feed may be generated therefrom. Commentators for each market (e.g., English-language countries, Spanish-language countries, etc.) observe the play and provide market-specific audio commentary. Therefore, each market receives a broadcast consisting of the main video feed, the main audio feed, and the market-specific audio commentary.

Graphics are increasingly used to enhance the understanding and enjoyment of broadcasts. Continuing with sport-related examples, current scores, time remaining and other relevant statistics (e.g., shots on goal, saves, etc.) may be selectively presented using graphic overlays which are combined with the main video feed. However, as with the market-specific audio commentary described above, these graphics preferably reflect a language that corresponds to the market in which the graphics will be viewed. For example, during a soccer game that is simultaneously broadcast on both ESPN® and ESPN Deportes®, it may be necessary to display a graphic (with data) in English within the ESPN® broadcast and to display this same graphic in Spanish within the ESPN Deportes® broadcast.

Dedicated control rooms, computing systems and operators are currently required to generate the graphic overlays and resulting specific broadcast for each market.

BRIEF DESCRIPTION OF THE DRAWINGS

FIG. 7 is a tabular representation of a portion of a lookup table in accordance with some embodiments of the present invention.

FIG. 10 is a representation of a user interface in accordance with some embodiments of the present invention of the present invention.

FIG. 11 is a representation of a user interface in accordance with some embodiments of the present invention.

FIG. 12 is a tabular representation of a portion of a lookup table in accordance with some embodiments of the present invention.

DETAILED DESCRIPTION

Applicants have recognized that there is a need for methods, systems, apparatus, means and computer program products for efficiently generating multiple broadcasts including market-specific languages and/or visuals.

In some embodiments a first graphic overlay associated with a first video feed is determined. A second graphic overlay to associate with a second video feed is then automatically determined based on the determined first graphic overlay.

Determination of the first graphic overlay may be based on a command to associate the first graphic overlay with the first video feed. For example, a first manipulation of a first user interface of a first application may be detected, resulting in transmission of an indication of the first manipulation to a second application. A second manipulation of a second user interface of the second application is then executed in response to the received indication.

The second manipulation corresponds to the first manipulation. Moreover, in some embodiments, the first manipulation of the first user interface causes the combination of a first graphic overlay with a first video feed. Similarly, the second manipulation of the second user interface causes the combination of a second graphic overlay with a second video feed.

Prior to a discussion of these and other features in further detail (which will be provided below, by describing a system, individual devices, exemplary databases and processes according to some embodiments of the invention), a brief illustrative (but not limiting) example of the operation of some embodiments will be provided.

According to the illustrative example, a soccer game is being simultaneously broadcast on both ESPN® and ESPN Deportes®. To add graphic overlays to the ESPN® broadcast, an operator manipulates one or more user interfaces provided by a first software application. For example, the operator may manipulate a user interface to cause the display of an English-language graphic overlay (e.g., Shots) within the ESPN Broadcast®.

The first software application transmits an indication of the manipulation to a second software application which is controlling the display of Spanish-language graphic overlays within the ESPN Deportes® broadcast. Based on the indication, the second software application correspondingly manipulates its own user interface. This second manipulation results in the display of a corresponding Spanish-language graphic overlay (e.g., Tiros) within the ESPN Deportes® broadcast.

Further details and features of some embodiments of the present invention will now be described. The illustrative example introduced above will be revisited to further illustrate features of some embodiments.

Figure 1:
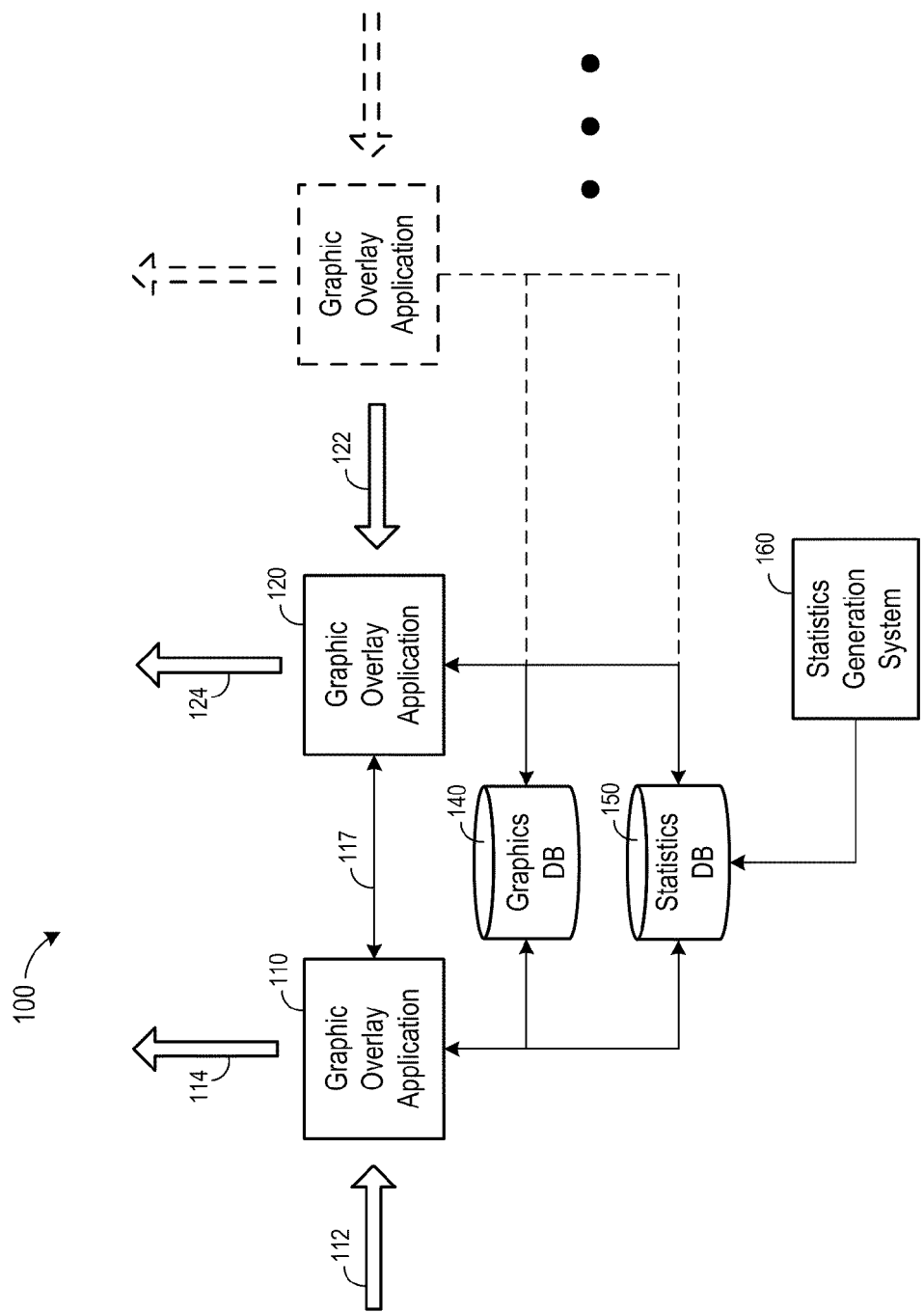
FIG. 1 is a functional block diagram of a system in accordance with some embodiments of the present invention.

Functional block diagram 100 of FIG. 1 illustrates an implementation of some embodiments of the invention. Each functional block may comprise any number of hardware and/or software elements suitable to provide the functions attributed thereto as well as any other functions. Although the functional blocks are depicted as communicating via dedicated connections, it should be understood that all communications described herein may occur over any number of public and/or private networks, including but not limited to the Internet. Two or more devices implementing any one or more illustrated functional blocks may be located remote from one another and may communicate with one another via any known manner of network(s) and/or a dedicated connection.

Graphic overlay application 110 may combine a graphic overlay with video feed 112 to generate combined video feed 114. According to some embodiments that will be described in detail below, this combination results from a manipulation of a user interface of graphic overlay application 110. Graphic overlay application 110 may also transmit an indication of the manipulation to graphic overlay application 120 via communication link 117.

In response to the received indication, graphic overlay application 120 may execute a corresponding manipulation of its own user interface. As a result, graphic overlay application 120 may combine a graphic overlay with video feed 122 to generate combined video feed 124.

Video feeds 112 and 122 may be identical, but embodiments are not limited thereto. For example, video feed 112 may be generated for an English-language broadcast of a soccer match based on video signals received from a set of video cameras, while video feed 122 may be independently generated for a Spanish-language broadcast of the same soccer match based on video signals received from the same or a different set of video cameras.

As depicted in FIG. 1, embodiments may include one or more additional graphic overlay applications, video feeds, and combined video feeds. Each of the one or more additional graphic overlay applications may receive the indication of the manipulation from graphic overlay application 110 and, in response, execute a corresponding manipulation of its own user interface. Each of the one or more additional graphic overlay applications may thereby combine a graphic overlay with its video feed to generate a combined video feed.

According to one example, graphic overlay application 110, graphic overlay application 120 and a third graphic overlay application may generate, respectively, an English-language combined video feed, a Spanish-language combined video feed, and a German-language combined video feed based on a same video feed. The combined video feeds would include, respectively, an English-language graphic overlay, a Spanish-language graphic overlay, and a German-language graphic overlay. Moreover, each of the three graphic overlays would present substantially the same information, albeit in different languages. Additional details of this and other examples are provided below.

Each graphic overlay application of diagram 100 may obtain graphic overlays from graphics database 140. Graphics database 140 may provide links to images (and/or actual images) that may be used to generate graphic overlays in various languages. One example of graphics database 140 is described below with respect to FIG. 6. Additionally or alternatively, each graphic overlay application may be hard-coded with the images used to generate graphic overlays.

Statistics database 150 may provide historical and/or current statistics for populating graphic overlays which are used as described herein. Statistics database 150 may be pre-populated with historical statistics and supplemented during a live event with information provided by statistics generation system 160. As will be described below, the user interface of graphic overlay application 110 may allow an operator to directly input statistics/information for populating the graphic overlays.

Embodiments are not limited to the elements illustrated in FIG. 1. Each element may include any number of disparate hardware and/or software elements, some of which may be located remotely from one another. Functions attributed to one element may be performed by one or more other elements in some embodiments.

Figure 2:
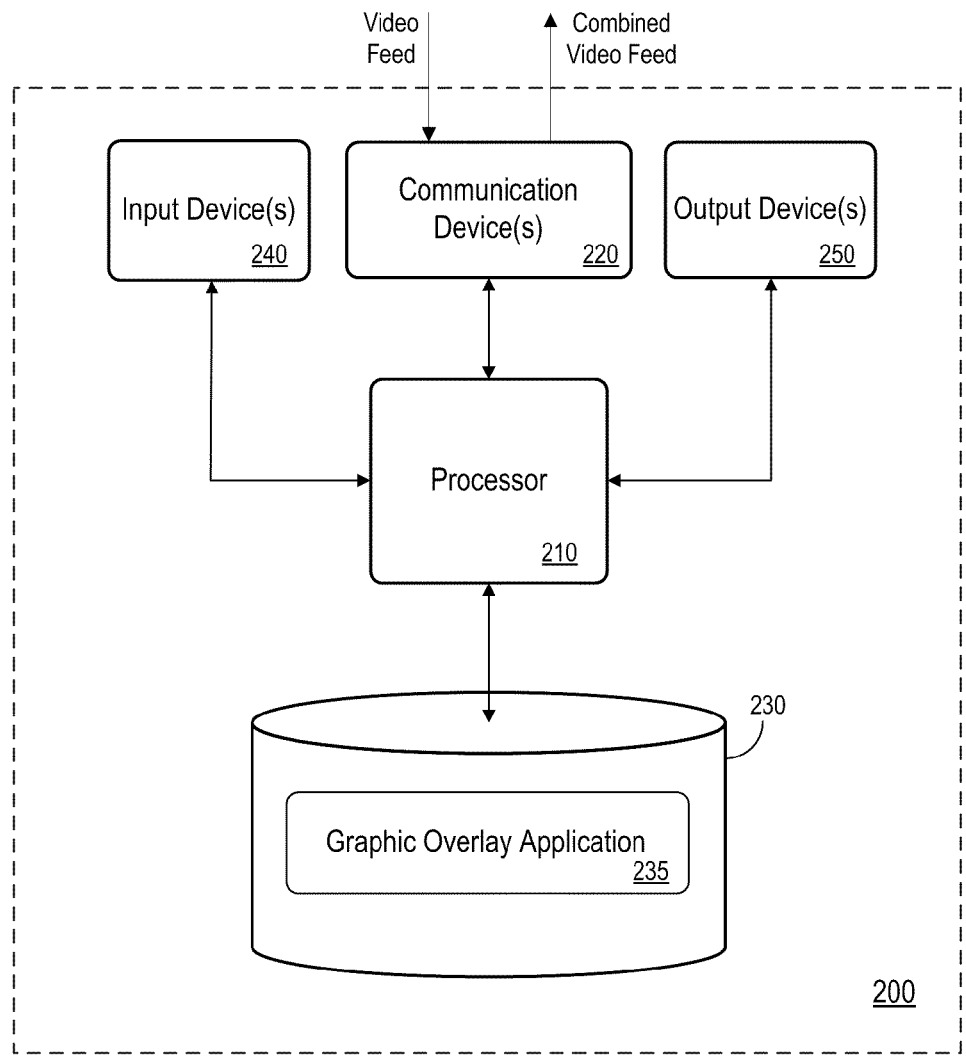
FIG. 2 is a block diagram of a system in accordance with some embodiments of the present invention.

FIG. 2 is a block diagram of computing system 200. Computing system 200 may perform functions attributed above to graphic overlay application 110 and/or to graphic overlay application 120 according to some embodiments. Computing system 200 may comprise any suitable system, including but not limited to a personal computer, a laptop computer, a smartphone, and a tablet computer.

Computing system 200 includes computer processor 210 operatively coupled to one or more communication devices 220, data storage device 230, one or more input devices 240 and one or more output devices 250.

Communication device(s) 220 may facilitate communication with one or more networks and/or external devices. For example, in a case that computing system 200 performs the functions of graphic overlay application 110, the indication of user interface manipulation may be transmitted from computing system 200 via communication device(s) 220. Communication device(s) 230 may be similarly used, as illustrated, to receive a video feed and to output a combined video feed.

Input device(s) 240 may comprise, for example, a keyboard, a keypad, a mouse or other pointing device, a microphone, knob or a switch, an infra-red (IR) port, a docking station, and/or a touch screen. Input device(s) 240 may be used, for example, to manipulate user interfaces presented by output device(s) 250. Output device(s) 250 may therefore comprise a display (e.g., a display screen), but may also comprise a speaker, a printer, etc.

Data storage device 230 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Data storage device 230 stores instructions adapted to be executed by processor 210. Graphic overlay application 235 may comprise a set of such instructions, and may be executed by processor 210 to cause system 200 to operate as described below with respect to a "first application" and/or a "second application". Graphic overlay application 235 may comprise any type of executable instructions, including but not limited to a desktop application, a database procedure, a database application, and a server application.

The first application and second application described below may each comprise a separate instantiation of graphic overlay application 235. In particular, a first device (e.g., system 200) may execute graphic overlay application 235 to provide the functions attributed below to a first application, while a second device may execute a graphic overlay application which is identical to application 235 to provide the functions attributed below to a second application. However, as also described below, the graphic overlay applications executed by these devices may be configured differently.

Data storage device 230 may also store data used during execution of graphic overlay application 235 according to some embodiments. This data may include images, phrase translation tables, or the like, but embodiments are not limited thereto. Computing system 200 may include unshown elements for providing additional functionality and/or which are necessary for operation thereof, such as device drivers, operating system files, etc.

Figure 3:
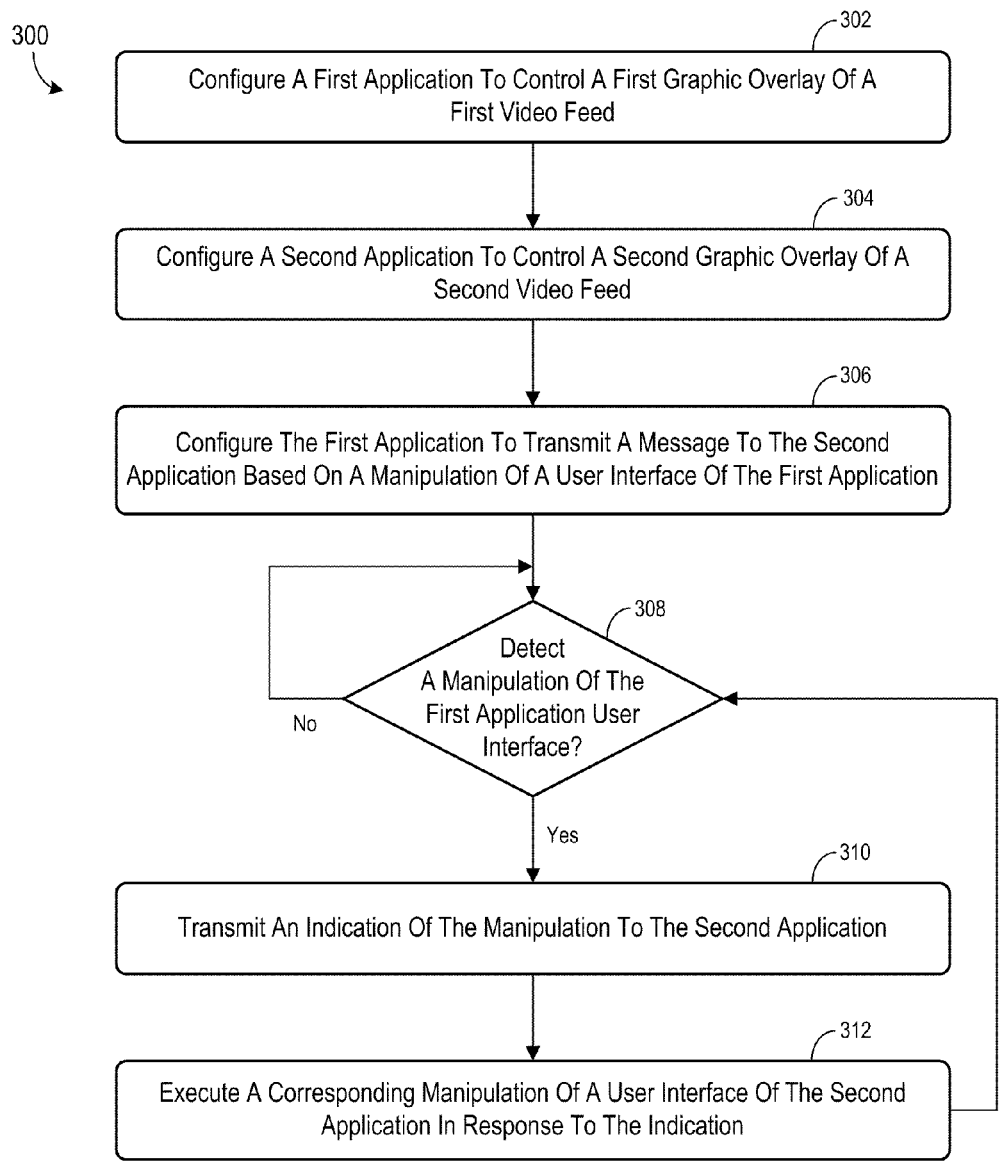
FIG. 3 is a flow chart of a method in accordance with some embodiments of the present invention.

FIG. 3 is a flow diagram of process 300 according to some embodiments. Various elements of diagram 100 and/or computing system 200 may execute process 300 according to some embodiments. The flow diagram of process 300 does not necessarily imply a fixed order to the actions, and embodiments may be performed in any order that is practicable. Process 300 may be embodied within instructions of graphic overlay application 235, but embodiments are not limited thereto.

Process 300 and all other processes mentioned herein may be embodied in processor-executable instructions read from one or more computer-readable media, such as a floppy disk, a CD-ROM, a DVD-ROM, a Zip™ disk, and a magnetic tape, and then stored in a compressed, uncompiled and/or encrypted format. In some embodiments, hard-wired circuitry may be used in place of, or in combination with, instructions for implementation of processes according to some embodiments. Embodiments are therefore not limited to any specific combination of hardware and software.

Generally, process 300 provides determination of a first graphic overlay associated with a first video feed, and automatic determination of a second graphic overlay to associate with a second video feed based on the determined first graphic overlay. Embodiments are not limited to process 300 or to any of the examples below for providing this functionality.

At 302, a first application is configured to control a first graphic overlay of a first video feed. According to some embodiments, 302 includes specifying the first video feed and a language/market to be served via a configuration facility provided by the first application, or via some controlling data structure thereof. In a more particular example, an operator may operate computing device 200 to invoke graphic overlay application 235 and to specify that graphic overlay application 235 is to operate in English-language mode to generate English-language output.

Next, at 304, a second application is configured to control a second graphic overlay of a second video feed. Step 304 may proceed similarly to 302, but using a second device executing the second application. Continuing with the present example, an operator may operate a device to execute a second graphic overlay application (e.g., graphic overlay application 120) and to specify Spanish-language operation and Spanish-language output. As mentioned above, the second application and the first application may be distinct instances of a same application.

The first application and/or the second application may be implemented in a client/server (e.g., Web-based) architecture, in which user interfaces are presented to the operator through a Web browser executed by a client device, and in which the application is executed by a remote server. Such a remote server may execute both the second application and the first application.

The first application is further configured at 306 to transmit a message to the second application based on a manipulation of a user interface of the first application. According to some embodiments, step 306 includes configuring the first application to function as a "Master" and configuring the second application to function as a "Slave".

Figure 4:
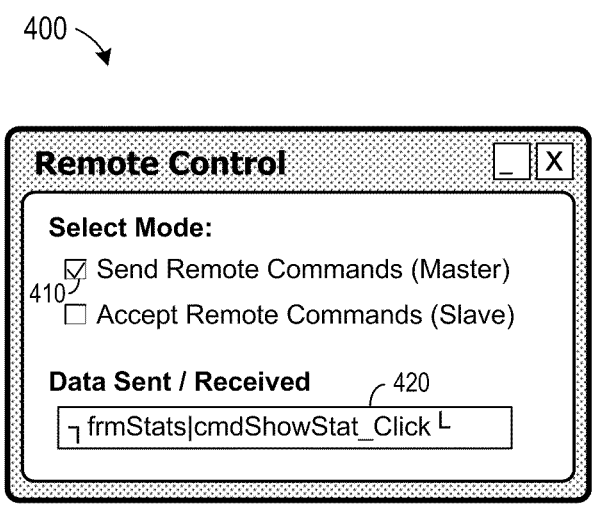
FIG. 4 is a representation of a user interface in accordance with some embodiments of the present invention.

FIG. 4 is an outward view of user interface 400 which may be displayed and manipulated at 306. To configure the first application at 306, an operator selects check box 410 (i.e., to indicate that the first application is to function as a Master). As a result of this selection, one or more string messages (i.e., indications) are sent to all Slave applications in response to particular manipulations of particular user interfaces of the first application. These manipulations may include, but are not limited to, selecting a statistical category, selecting a button displayed on a user interface, and detected clock ticks.

According to some embodiments, a Master device detects a manipulation of a user interface, identifies a string message corresponding to the manipulation, and transmits the string message to Slave devices via Transmission Control Protocol/Internet Protocol (TCP/IP). Field 420 of user interface 400 may display transmitted messages during operation.

Step 306 may also include generation of the string messages which correspond to the user interface manipulations. The following code may be used in some embodiments to generate string messages based on the controls of a given user interface, or form. More specifically, the name of a form and, optionally, a procedure call are passed to the BuildRemoteCommand function at 306. The BuildRemoteCommand function uses the BuildControlValuesString function to create a string based on the controls within the form. The BuildControlValuesString function iterates through all the controls (e.g., CommandButton, ComboBox, VScrollBar, CheckBox, ClockCtl, ListBox, etc.) on the form and builds a string containing the name of each control along with a predetermined property value for each control by type.

```
Public Function BuildRemoteCommand(ByVal frm As Form, Optional
ByVal ProcToCall As String) As String
        Dim sCommand As String
        If (ProcToCall = "") Or (IsMissing(ProcToCall) = True)
        Then
                sCommand = Chr(2) & frm.Name & "|" &
BuildControlValuesString(frm) & Chr(3)
        Else
                sCommand = Chr(2) & frm.Name & "|" &
                ProcToCall & Chr(3)
        End If
        BuildRemoteCommand = sCommand
    End Function
Private Function BuildControlValuesString(ByVal frm As Form) As String
        Dim ctl As Control
        Dim sControlValues As String
        Dim iCount As Integer
        For Each ctl In frm.Controls
                iCount = iCount + 1
                Select Case TypeName(ctl)
                        Case "CommandButton", "Label"
                                sControlValues = sControlValues &
ctl.Name & ".Caption=" & ctl.Caption & IIf(iCount < frm.Count, "|", "")
                        Case "TextBox", "ComboBox"
                                sControlValues = sControlValues &
ctl.Name & ".Text=" & ctl.Text & IIf(iCount < frm.Count, "|", "")
                        Case "VScrollBar", "CheckBox", "OptionButton"
                                sControlValues = sControlValues &
ctl.Name & ".Value=" & ctl.Value & IIf(iCount < frm.Count, "|", "")
                        Case "ClockCtl"
                                sControlValues = sControlValues &
ctl.Name & ".Seconds=" & ctl.Seconds & IIf(iCount < frm.Count, "|", "")
                        Case "ListBox"
                                If (ctl.ListIndex <> -1) Then
                                        If ValidateItemData(ctl) = True Then
                                                sControlValues = sControlValues
& ctl.Name & ".ItemData=" & ctl.ItemData(ctl.ListIndex) &
IIf(iCount < frm.Count, "|", "")
                                        Else
                                                sControlValues = sControlValues
& ctl.Name & ".ListIndex=-1" & IIf(iCount < frm.Count, "|", "")
                                        End If
                                End If
                End Select
        Next ctl
        BuildControlValuesString = sControlValues
    End Function
```

Therefore, when a control of a user interface (i.e., form) is manipulated, a message describing the manipulation can be determined from the string which was generated at 306 based on the controls of the user interface. As will be described below, this message may then be used to execute a corresponding manipulation of another user interface.

User interface 400 may be provided by both the first application and the second application (e.g., particularly in cases where the first application and the second application are instances of a same application), although the manipulation of user interface 400 at 306 would differ depending upon which application was being configured. For example, 306 may also include manipulating user interface 400 of the second application to specify that the second application is to behave as a Slave device (i.e., to listen for messages from Master devices).

Figure 5:
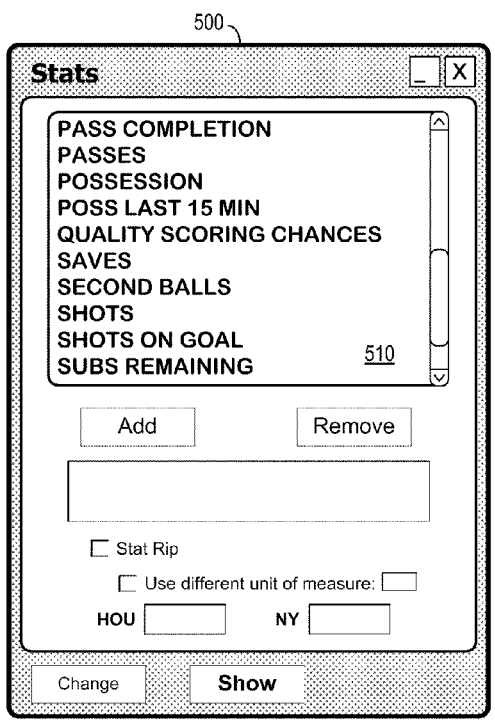
FIG. 5 is a representation of a user interface in accordance with some embodiments of the present invention of the present invention.
Figure 6:
FIG. 6 is a representation of a user interface in accordance with some embodiments of the present invention.

FIGS. 5 and 6 illustrate user interfaces of a first application and a second application configured as described above according to some embodiments. User interface 500 and user interface 600 are examples of user interfaces for controlling a graphic overlay of a respective video feed according to some embodiments.

As shown, user interface 500 includes listbox 510 for selecting English-language graphic overlays corresponding to particular soccer statistics. User interface 600 includes similar listbox 610 for selecting Spanish-language graphic overlays corresponding to particular soccer statistics.

In some embodiments, listboxes 510 and 610 are populated based on the configuration of steps 302 and 304. For example, the first application may include hard-coded data specifying several statistical categories in each of multiple languages. Since the first application was configured to control English-language overlays, listbox 510 displays a hard-coded set of English-language statistical categories. Listbox 610 displays a hard-coded set of Spanish-language statistical categories for similar reasons.

Each statistical category of listbox 510 and listbox 610 may be associated with an ItemData property referred to herein as a Stat ID. A Stat ID may establish a correspondence between statistical categories of each listbox. As will be described in detail below, this correspondence may facilitate automatic manipulation of listbox 610 to correspond to a manipulation of listbox 510. For example, the category Shots of listbox 510 may be associated with Stat ID "18" while the category Tiros of listbox 610 may also be associated with Stat ID "18". Upon detecting a user selection of the category Shots of listbox 510 of the first application, a message may be transmitted to the second application indicating that Stat ID "18" was selected. The second application therefore selects the category associated with Stat ID "18" (i.e., "Tiros") in its listbox 610.

FIG. 7 illustrates a portion of table 700 which includes sets of statistical categories as described above. Table 700 may be accessible to the first device and to the second device (e.g., within graphics database 140) and/or maintained separately within each device. Table 700 may provide flexibility in adding new statistical categories to or removing existing statistical categories from listboxes 510 and 610. For example, the first application has been configured to operate in an English-language mode and therefore listbox 510 of user interface 500 is populated with the terms in the "English" column of table 700.

Table 700 associates a single Stat ID with each statistical category. The corresponding Stat IDs of table 700 may be stored as ItemData property values of listbox 510. Table 700 therefore allows identification of a term for a statistical category in any supported language, based solely on the Stat ID of the category. A Stat ID may also be used as described below to identify a graphic overlay to be displayed.

Returning to process 300, flow pauses at 308 until the first application detects a manipulation of the first user interface. Therefore, step 308 may be executed after the above-described configuration and during a broadcast.

Figure 8:
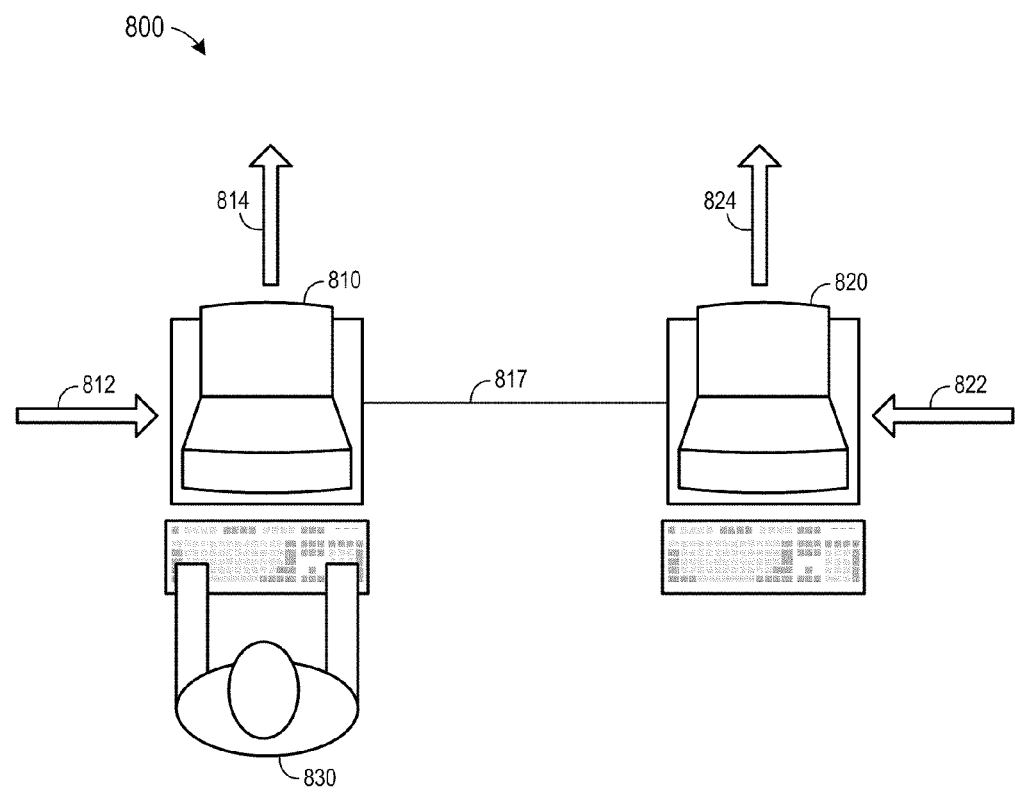
FIG. 8 illustrates a use case of a system in accordance with some embodiments of the present invention.

FIG. 8 is a representative view of system 800 to perform steps 308 through 312 of process 300 during a broadcast. System 800 includes first device 810 executing a first graphic overlay application and second device 820 executing a second graphic overlay application. First device 810 receives first video feed 812 and outputs combined video feed 814. Second device 820 receives second video feed 822 and outputs combined video feed 824. Notably, operator 830 is positioned to operate first device 810 and no operator is positioned to operate second device 820.

In some embodiments, an external video switcher in communication with first device 810 receives first video feed 812, receives a graphic overlay from first device 810, and produces combined video feed 814 therefrom. An external video switcher may also be employed to produce combined video feed 824 based on second video feed 822 and on a graphic overlay received from second device 820. Accordingly, any video combination function described herein may be performed by an internal device and/or an external device.

It will be assumed that combined feed 814 is intended for English-language markets and combined feed 824 is intended for Spanish-language markets. Moreover, the first application of first device 810 has been configured to control English-language graphic overlays and to operate as a Master, while the second application of second device 820 has been configured to control Spanish-language graphic overlays and to operate as a Slave.

Figure 9:
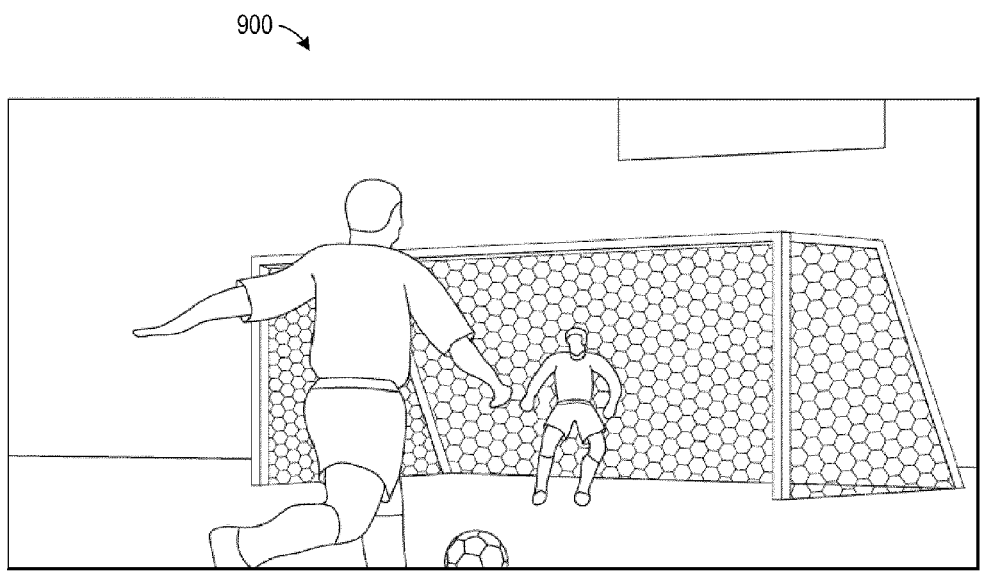
FIG. 9 illustrates a displayed video feed and graphic overlay.

FIG. 9 illustrates video frame 900 of video feed 812 and of video feed 822 during step 308 of process 300 according to the present example. In other words, first video feed 812 is identical to second video feed 822 for at least the time period of the frame shown in FIG. 9. Embodiments are not limited to identical incoming video feeds.

If no graphic overlays are present, video frame 900 may also be a frame of video feed 814 and/or video feed 824 as displayed by a receiving device (e.g., television, computer) during a broadcast. In some embodiments, steps 308 through 312 may be executed regardless of any graphic overlays which may be currently combined with the incoming video feeds (i.e., feeds 812 and 822) by device 810 or device 820.

During the broadcast, operator 830 may manipulate one or more user interfaces of a first application of first device 810 to control a first graphic overlay of first video feed 812. FIG. 10 illustrates such a manipulation of user interface 500 according to some embodiments. Operator 830 has selected Shots statistical category 515 of listbox 510. According to the illustrated example, selection of Shots statistical category 515 has caused the first application to automatically retrieve corresponding values from statistics database 150 and to populate fields 520 and 525 therewith. Operator 830 may change these values or prevent such automatic retrieval according to some embodiments.

Selection of Shots statistical category 515 also causes the first application to transmit an indication of the manipulation to the second application at 310. With reference to FIG. 8, the indication may be transmitted from device 810 to device 820 via link 817. Referring to the code examples provided above, the indication comprises the message "formStats|1stDDStats.ItemData=18", where "18" is a value corresponding to Shots statistical category 515 and stored in the ItemData property of listbox 510. Also transmitted at 310 is the message "formStats|1stDDStats_Click" to indicate the listbox click event.

Next, at 312, the second application executes a corresponding manipulation of its user interface in response to the transmitted indication. FIG. 11 illustrates a corresponding manipulation according to the present example. Specifically, Tiros statistical category 615 has been selected in listbox 610. As described above, Tiros statistical category 615 may be selected because it shares the same Stat ID as selected category 515 of listbox 510.

As illustrated in FIG. 8, the user interface of the second application executing on device 820 is manipulated without requiring the presence of a dedicated operator. In accordance with some embodiments of the present invention, the actions of operator 830 advantageously result in manipulations of both user interface 500 and user interface 600.

In a particular implementation of step 312, the second application receives the messages "formStats|1stDDStats.ItemData=18" and "formStats|1stDDStats_Click" as mentioned above. The following code may be used in some embodiments to decode the received messages. The ParseRemoteCommand function splits incoming messages based on the "|" delimiter. Next, user interface properties are set and/or user interface procedures are called based on the split messages.

```
Public Sub ParseRemoteCommand(ByVal Command As String)
        Dim sSplitCommand( ) As String
        Dim sSplitCtlNameAndValue( ) As String
        Dim sSplitCtlNameAndProperty( ) As String
        Dim frm As Form
        Dim ctl As Control
        Dim iLoop As Integer
    'On Error GoTo ParseRemoteCommandError
    On Error Resume Next
        Command = Replace(Command, Chr(2), "")
        Command = Replace(Command, Chr(3), "")
        sSplitCommand = Split(Command, "|")
        For Each frm In Forms
            If frm.Name = sSplitCommand(0) Then
                If frm.Visible = False Then
                    frm.Show
                End If
                Exit For
            End If
        Next frm
        For iLoop = 1 To UBound(sSplitCommand)
            If InStr(1, sSplitCommand(iLoop), "=") > 0 Then
                sSplitCtlNameAndValue =
                Split(sSplitCommand(iLoop), "=")
                If InStr(1, sSplitCtlNameAndValue(0), ".") > 0
                Then
                    sSplitCtlNameAndProperty =
                    Split(sSplitCtlNameAndValue(0), ".")
                    Set ctl =
                    frm.Controls(sSplitCtlNameAndProperty(0))
                    If Not ctl Is Nothing Then
                        If sSplitCtlNameAndProperty(1) =
                        "ItemData" Then
                            Dim lngItemData As Long
                            lngItemData = GetIndexByItemData(ctl,
                            CLng(sSplitCtlNameAndValue(1)))
                                If (lngItemData <> -1) Or
                                (sSplitCtlNameAndProperty(0) =
                                "1stDDStats")
Then
                                    CallByName ctl, "ListIndex",
                                    VbLet, lngItemData
                                End If
                            Else
                                CallByName ctl,
sSplitCtlNameAndProperty(1), VbLet, sSplitCtlNameAndValue(1)
                            End If
                        End If
                    End If
                Else
                    If sSplitCommand(iLoop) <> "" Then
                        CallByName frm, sSplitCommand(iLoop),
                        VbMethod
                    End If
                End If
            Next iLoop
            Exit Sub
ParseRemoteCommandError:
            Debug.Print frm.Name & "(" & sSplitCommand(iLoop) & "): "
            & Err.Description
            Err.Clear
    End Sub
```

As described above, the first application and the second application may comprise instantiations of a same application in some embodiments. Accordingly, the first user interface may be identical to the second user interface, except for the selective presentation of language/market-specific terms. However, embodiments may be implemented by any applications and user interfaces as long as a manipulation of a user interface of the second application may be executed based on an indication of a manipulation of a first interface of the first application. In the present example, since the indication transmitted by the first application refers only to controls and property values, the second application need only be adapted to manipulate its own corresponding user interface based on the referred-to controls and property values. The appearance of the corresponding user interface of the second application may therefore differ by any degree from the user interface of the first application.

Flow returns from 312 to 308 to await detection of another manipulation of the first user interface. It will be assumed that operator 830 now "clicks" on Show button 530. This manipulation is detected at 308 and a corresponding indication is transmitted to the second application at 310. In some embodiments, the message "formStats|cmdShowStat_Click" is transmitted at 310. As a result, the second application "clicks" button 630 of user interface 600 at 312 without requiring direct manipulation of user interface 600 by an operator.

Both of the foregoing user interface manipulations result in the combination of a corresponding graphic overlay with an incoming video feed. For example, in response to selection of Show button 530, the first application initially determines a corresponding graphic overlay. The graphic overlay may correspond both to the currently-selected statistical category (i.e., Shots) and to the language/market specified during configuration of the first application. The corresponding graphic overlay may be hard-coded into the first application or may be determined based on a lookup table such as graphics database 150.

FIG. 12 shows a tabular representation of a portion of graphic database 150 according to some embodiments. Graphic database 150 provides links to images associated with various combinations of Stat IDs and languages/markets. The links may comprise folder paths, Uniform Resource Locators, etc., which point to any accessible data store. In some embodiments, images associated with English-language markets may include the trademark ESPN® and images associated with Spanish-language markets may include the trademark ESPN Desportes®. A graphic overlay may be determined in the present example by locating a link within the row corresponding to Stat ID "18" and the column corresponding to "English Graphic".

The determined graphic overlay is then combined with first video feed 812. Any video processing system that is or becomes known may be employed to combine the overlay with the feed so as to generate combined video feed 814.

Figure 13:
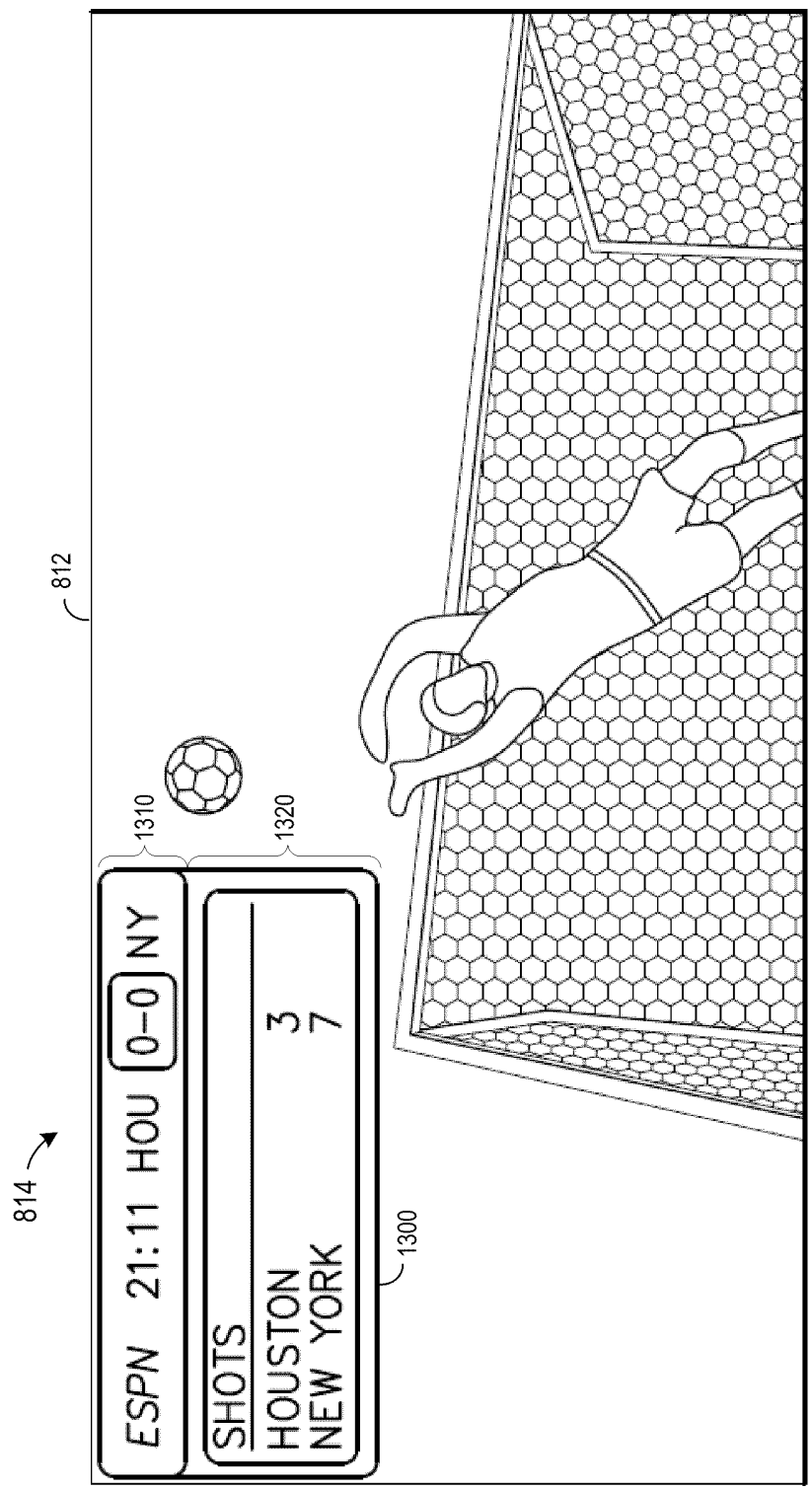
FIG. 13 illustrates a displayed video feed and graphic overlay in accordance with some embodiments of the present invention.

FIG. 13 shows a displayed frame of combined feed 814 according to some embodiments. Combined feed 814 includes a frame of feed 812 as well as determined graphic overlay 1300. In some embodiments, graphic overlay 1300 includes graphic 1310 and graphic 1320. In other embodiments, graphic 1310 is continuously combined with video feed 812 during the broadcast of combined feed 814, and graphic 1320 is determined and combined with video feed 812 and graphic 1310 in response to the above-described manipulation of user interface 500.

Similarly, and in response to the automatically-executed selection of Show button 630 of user interface 600, the second application determines a graphic overlay corresponding to the currently-selected statistical category (i.e., Tiros) and to the language/market specified during its configuration (i.e., Spanish-language). The graphic overlay may be hard-coded into the second application or may be determined based on graphics database 150 as described above. According to the present example, the second application then combines the determined graphic overlay with second video feed 822 to generate combined video feed 824.

Figure 14:
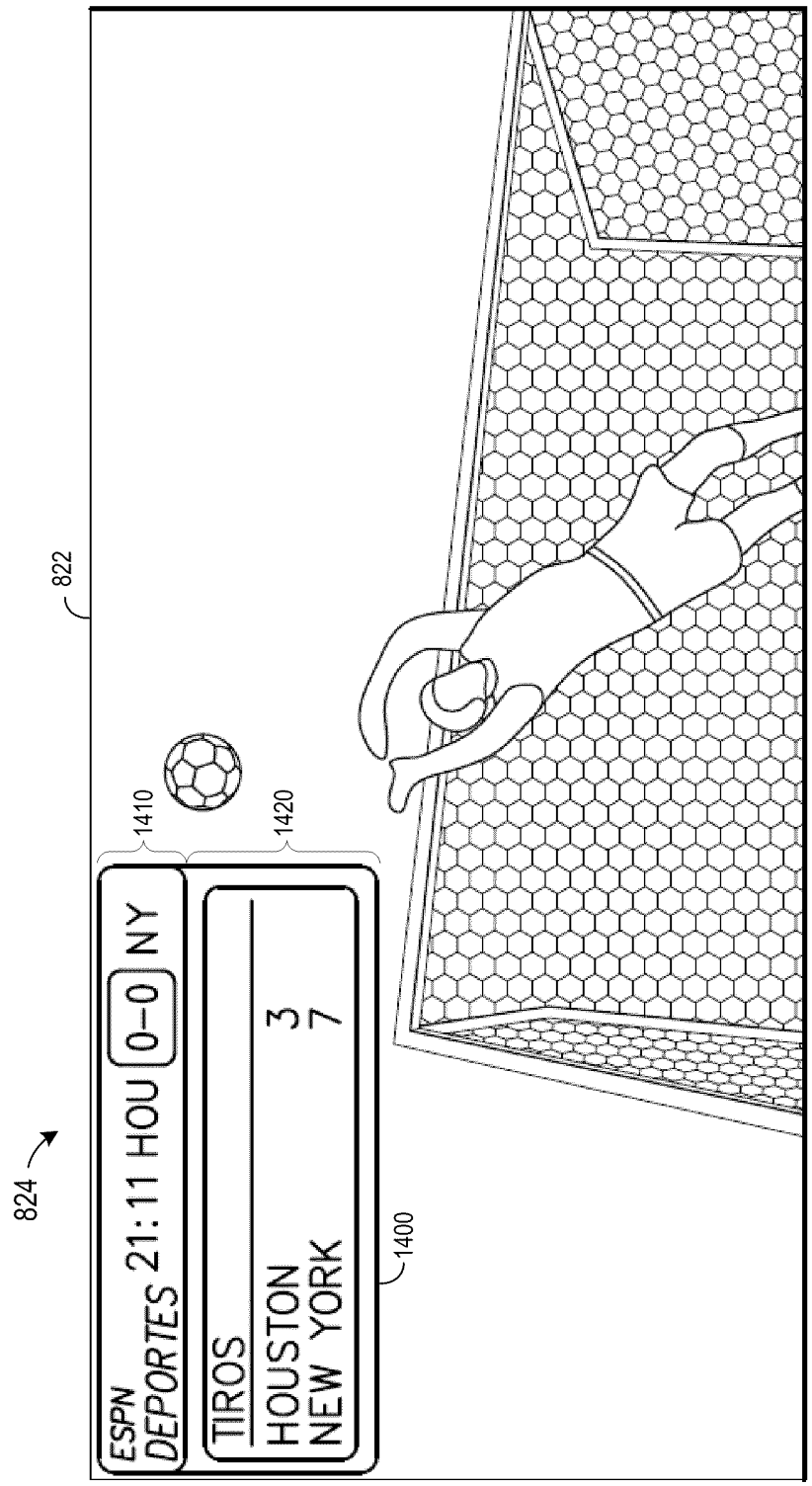
FIG. 14 illustrates a displayed video feed and graphic overlay in accordance with some embodiments of the present invention.

FIG. 14 shows a displayed frame of combined video feed 824 according to some embodiments. Combined feed 824 includes a frame of second video feed 822 as well as determined graphic overlay 1400. Advantageously, graphic overlay 1400 is suitable for a Spanish-language market (e.g., "ESPN Desportes®", "Tiros") and corresponds to overlay 1300 (i.e., "Tiros"="Shots"). A graphic overlay provided by a Master application may differ in any manner from a corresponding overlay provided by a Slave application according to some embodiments. Again, overlay 1400 may include graphic 1410 and graphic 1420, or may consist only of the portion denoted 1410 in FIG. 14.

Flow may continue to cycle through 308, 310 and 312 during the broadcast. During this cycling, indications of operator 830's manipulations of the first user interface are transmitted to the second application, and the second user interface is manipulated based thereon. As a result, in the present example, the addition of a statistic-related graphic overlay to first video feed 812 will result in the addition of a corresponding statistic-related graphic overlay to second video feed 822.

In some embodiments, the manipulation detected at 308 need not be operator-initiated. For example, a user interface of the first application (e.g., a "Clock and Score" form) may be configured to update itself in response to every change of a game clock or game score. Therefore, when the game clock changes from 21:12 to 21:11, the first application may transmit the message formClockAndScore|clkClock.Seconds=1271 at 310. The second application may decode the message at 312 and set the Seconds property of its local Clock and Score form to "1271". This change may cause the combination of a corresponding graphic overlay (e.g., graphic 1410) with second video feed 822. Accordingly, the manipulations described herein may be performed automatically by a computing device.

Although the foregoing description refers primarily to graphic overlays, embodiments may implement any type of graphic enhancements that are or become known. For example, enhancements combined with an incoming video feed according to the present invention may exhibit any size, shape or location, and may comprise animated graphics (e.g., the overlay appears to move or slide into a position on the video feed) and/or one or more separate video feeds.

The embodiments described herein do not constitute a definition of all possible embodiments, and those in the art will understand that many other embodiments may be possible and/or practicable. Further, although the embodiments are briefly described for clarity, those in the art will understand how to make any changes, if necessary, to the above-described apparatus and methods to accommodate these and other embodiments and applications.

What is claimed is:

1. A method comprising:
   detecting a first manipulation of a first user interface of a first application executing on a first computing system, the first manipulation to select a first graphic overlay to combine with a first video feed, the first graphic overlay comprising a first one or more words in a first language;
   in response to the detection of the first manipulation, transmitting one or more messages describing the first manipulation to a second application executing on a second computing system;
   automatically determining, in response to reception of the one or more messages, a selected user interface control of the first user interface based on the one or more messages;
   automatically determining a user interface control of a second user interface of the second application executing on the second computing system which corresponds to the selected user interface control of the first user interface; and
   automatically executing a second manipulation of the second user interface, the second manipulation based on the one or more messages, and the second manipulation including selection of the user interface control of the second user interface,
   wherein the second manipulation selects a second graphic overlay to combine with a second video feed, the second graphic overlay comprising a second one or more words in a second language, and
   wherein the second one or more words comprise a translation of the first one or more words.

2. The method according to claim 1, further comprising:
   combining the second graphic overlay with the second video feed.

3. The method according to claim 2, wherein the second video feed is identical to the first video feed.

4. The method according to claim 1, further comprising:
   combining the first graphic overlay with the first video feed based on the first manipulation of the first user interface; and
   combining the second graphic overlay with the second video feed based on the second manipulation of the second user interface.

5. The method according to claim 4, wherein the second video feed is identical to the first video feed.

6. The method according to claim 1, wherein the first application and the second application are identical, and further comprising:
   configuring the first application to use the first user interface and the first graphic overlay; and
   configuring the second application to use the second user interface and the second graphic overlay.

7. The method according to claim 1, further comprising:
   in response to the detection of the first manipulation, transmitting one or more messages describing the first manipulation to a third application executing on a third computing system;
   automatically determining, in response to reception of the one or more messages transmitted to the third application, the selected user interface control of the first user interface;
   automatically determining a user interface control of a third user interface of the third application executing on the third computing system which corresponds to the selected user interface control of the first user interface; and automatically executing, in response to reception of the one or more messages, a third manipulation of the third user interface, the third manipulation based on the one or more messages, and the third manipulation including selection of the user interface control of the third user interface, wherein the third manipulation selects a third graphic overlay to combine with a third video feed, the third graphic overlay comprising a third one or more words in a third language, and wherein the third one or more words comprise a translation of the first one or more words.

8. The method according to claim 7,
wherein the first video feed, second video feed and third video feed are identical, and
wherein the first manipulation, second manipulation and third manipulation are identical.

9. A first computing system, comprising:
a first communication interface;
a first processor coupled to the first communication interface; and
a first storage device in communication with the first processor and storing a first application adapted to be executed by the first processor to:
  detect a first manipulation of a first user interface of a first application executing on the first computing system, the first manipulation to select a first graphic overlay to combine with a first video feed, the first graphic overlay comprising a first one or more words in a first language;
  in response to the detection of the first manipulation, transmit one or more messages describing the first manipulation to a second application executing on a second computing system;
  automatically determine, in response to reception of the one or more messages, a selected user interface control of the first user interface based on the one or more messages;
  automatically determine a user interface control of a second user interface of the second application executing on the second computing system which corresponds to the selected user interface control of the first user interface; and
  automatically execute, in response to reception of the one or more messages, a second manipulation of the second user interface, the second manipulation based on the one or more messages, and the second manipulation including selection of the user interface control of the second user interface,
  wherein the second manipulation selects a second graphic overlay to combine with a second video feed, the second graphic overlay comprising a second one or more words in a second language, and
  wherein the second one or more words comprise a translation of the first one or more words.

10. The first computing system according to claim 9, further comprising:
a device in communication with the first processor to combine the second graphic overlay with the second video feed.

11. The first computing system according to claim 10, wherein the second video feed is identical to the first video feed.

12. The first computing system according to claim 9, wherein the second video feed is identical to the first video feed.

13. The first computing system according to claim 9, further comprising:
a third computing system comprising:
a second communication interface;
a second processor coupled to the second communication interface; and
a second storage device in communication with the second processor and storing a second application adapted to be executed by the second processor to:
  transmit, in response to the detection of the first manipulation, one or more messages describing the first manipulation to a second application executing on a second computing system;
  automatically determine, in response to reception of the one or more messages transmitted to the third application, the selected user interface control of the first user interface;
  automatically determine a user interface control of a third user interface of the third application executing on the third computing system which corresponds to the selected user interface control of the first user interface; and
  automatically execute, in response to reception of the one or more messages, a third manipulation of a third user interface of the third application executing on the third computing system, the third manipulation based on the one or more messages, and the third manipulation including selection of the user interface control of the third user interface,
  wherein the third manipulation selects a third graphic overlay to combine with a third video feed, the third graphic overlay comprising a third one or more words in a third language, and
  wherein the third one or more words comprise a translation of the first one or more words.

14. A non-transitory computer-readable medium storing instructions adapted to be executed by a processor to perform a method, the method comprising:
detecting a first manipulation of a first user interface of a first application executing on a first computing system, the first manipulation to select a first graphic overlay to combine with a first video feed, the first graphic overlay comprising a first one or more words in a first language;
transmitting, in response to the detection of the first manipulation, one or more messages describing the first manipulation to a second application executing on a second computing system;
automatically determining, in response to reception of the one or more messages, a selected user interface control of the first user interface based on the one or more messages;
automatically determining a user interface control of a second user interface of the second application executing on the second computing system which corresponds to the selected user interface control of the first user interface; and
automatically executing, in response to reception of the one or more messages, a second manipulation of the second user interface, the second manipulation based on the one or more messages, and the second manipulation including selection of the user interface control of the second user interface, wherein the second manipulation selects a second graphic overlay to combine with a second video feed, the second graphic overlay comprising a second one or more words in a second language, and wherein the second one or more words comprise a translation of the first one or more words.

15. The non-transitory computer-readable medium according to claim 14, the instructions further adapted to be executed by a processor to:

combine the second graphic overlay with the second video feed, wherein the second video feed is identical to the first video feed.

16. The non-transitory computer-readable medium according to claim 14, the method further comprising:

transmitting, in response to the detection of the first manipulation, one or more messages describing the first manipulation to a second application executing on a second computing system;

automatically determining, in response to reception of the one or more messages transmitted to the third application, the selected user interface control of the first user interface;

automatically determining a user interface control of a third user interface of the third application executing on the third computing system which corresponds to the selected user interface control of the first user interface;

automatically executing, in response to reception of the one or more messages, a third manipulation of the third user interface, the third manipulation based on the one or more messages, and the third manipulation including selection of the user interface control of the third user interface, wherein the third manipulation selects a third graphic overlay to combine with a third video feed, the third graphic overlay comprising a third one or more words in a third language, and wherein the third one or more words comprise a translation of the first one or more words.

* * * * *